INVENTORS
JAMES L. OTSTOT,
MORRIS M. HESS,
BY

ATTORNEYS.

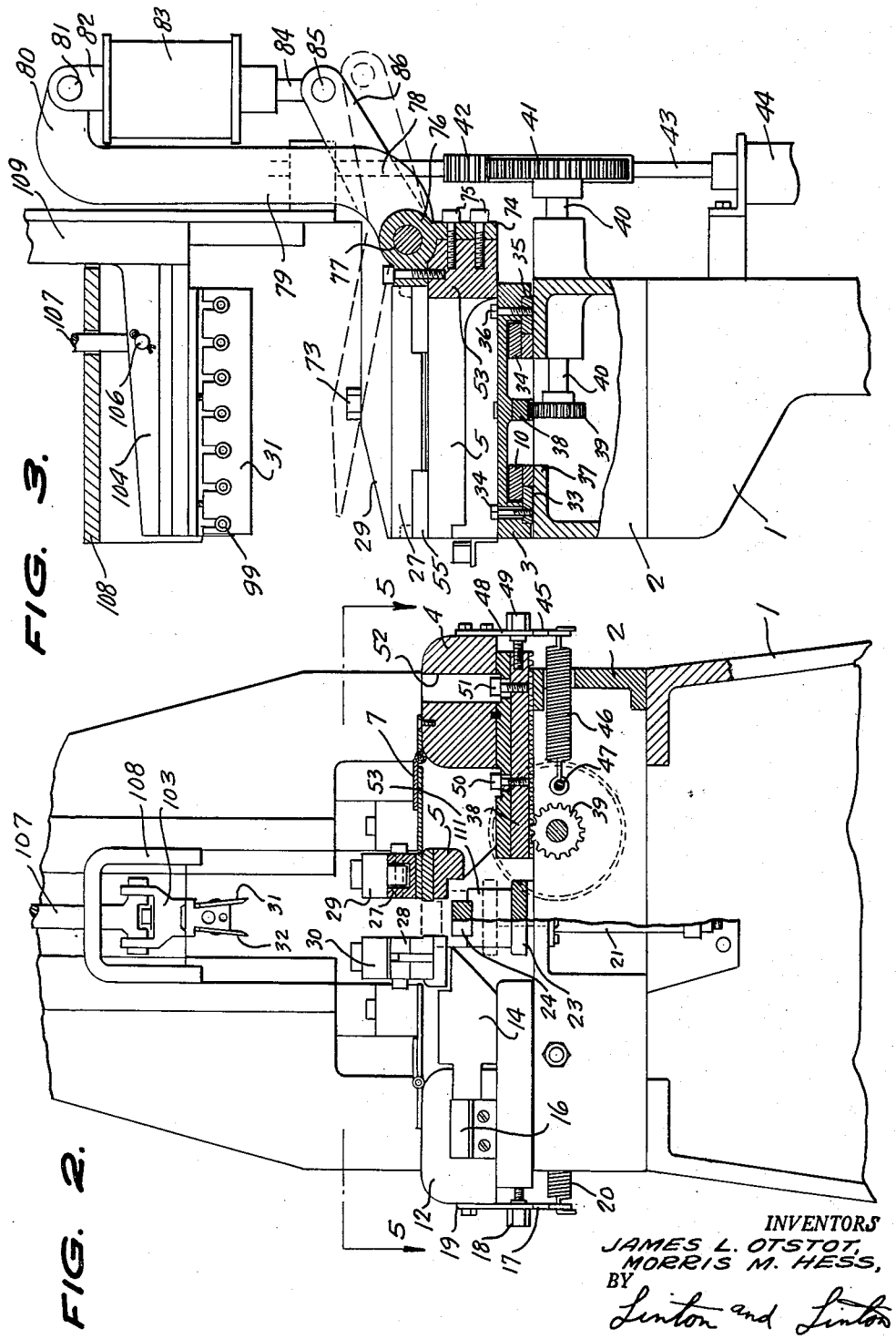

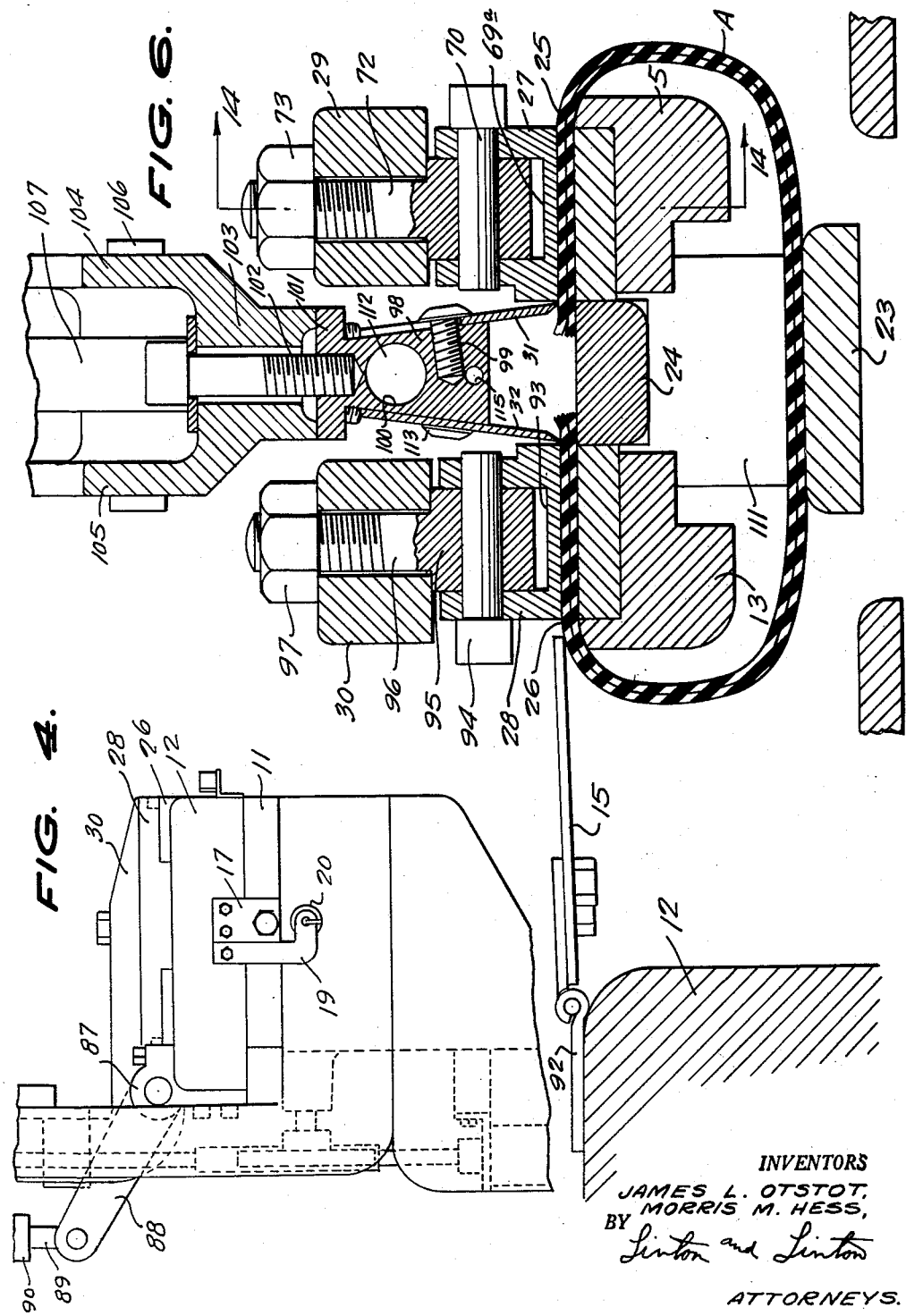

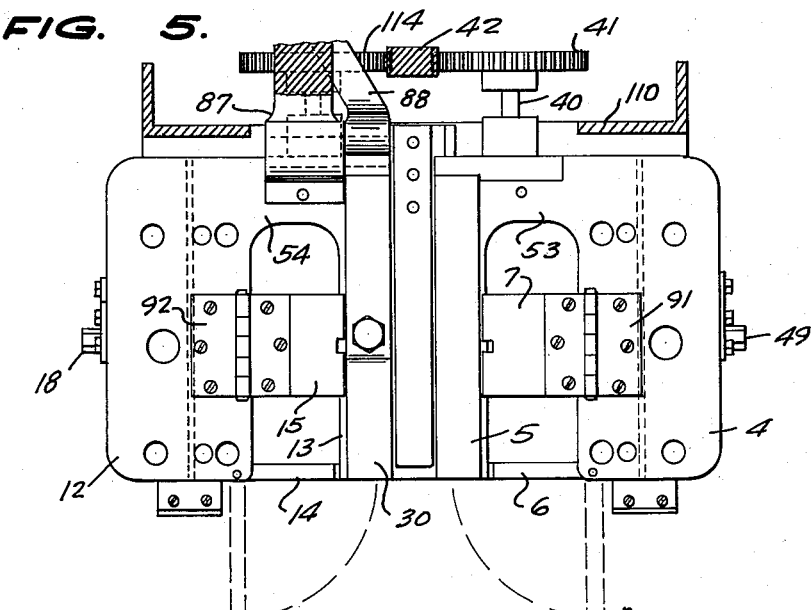
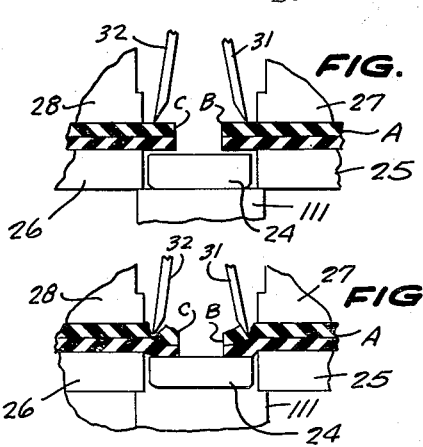
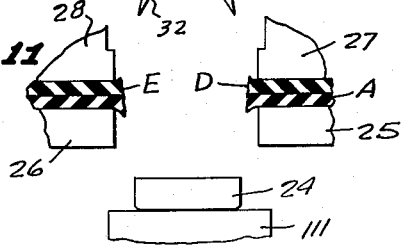
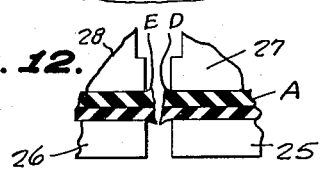
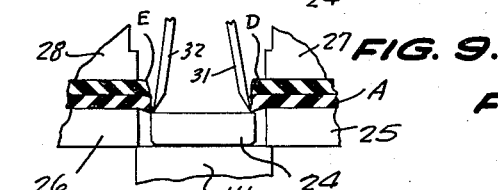
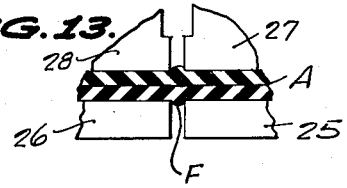
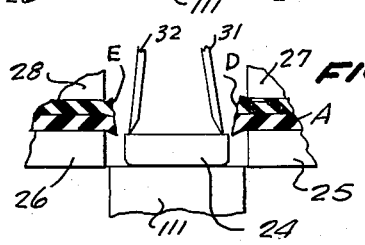
INVENTOR.
JAMES L. OTSTOT,
MORRIS M. HESS,
BY
ATTORNEYS.

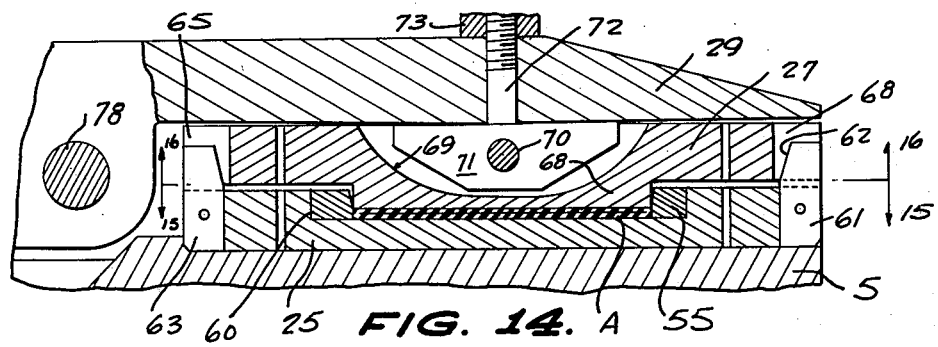
FIG. 14.
FIG. 15.
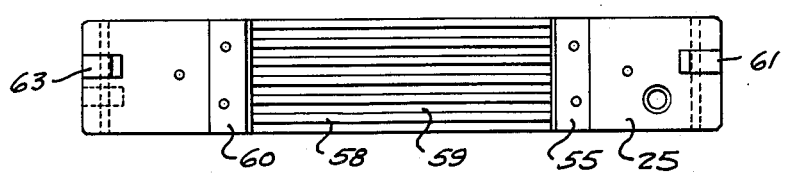
FIG. 16.
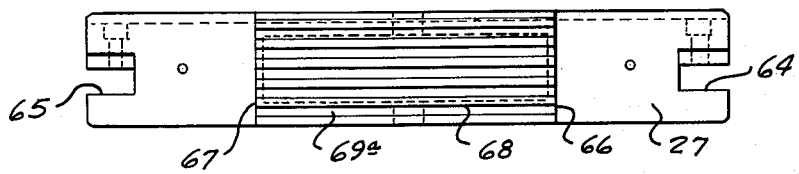
FIG. 17.
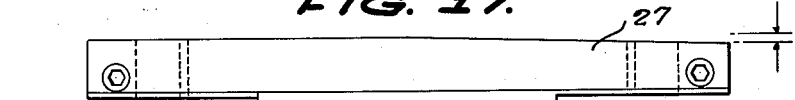
FIG. 18.
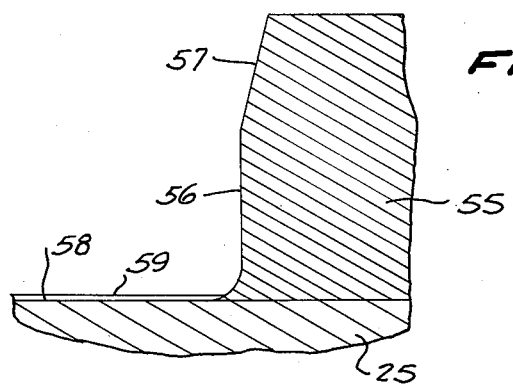
INVENTORS
JAMES L. OTSTOT,
MORRIS M. HESS,
BY
Linton and Linton
ATTORNEYS.

United States Patent Office 3,117,049
Patented Jan. 7, 1964

3,117,049
APPARATUS FOR SPLICING UNVULCANIZED RUBBER STOCK
James Lee Otstot and Morris M. Hess, Carlisle, Pa., assignors to Carlisle Tire and Rubber Division of Carlisle Corporation, a corporation of Delaware
Filed Nov. 4, 1960, Ser. No. 67,184
3 Claims. (Cl. 156—503)

The present invention relates to apparatus for splicing unvulcanized rubber stock and is more particularly concerned with an improvement in such machines.

The principal object of this invention is to provide an automatic machine for safely and positively splicing ends of unvulcanized rubber stock such as annular tubular sections of such rubber for forming pneumatic inner tubes and which machine can work on sections of annular stock having a smaller inside diameter spliced length than comparable known machines.

A further and important object of the invention is to provide a machine holding, step cutting and splicing opposing ends of an unvulcanized rubber stock with the stock ends being retained from slipping before and during the operation of the machine.

Another important object of the invention is to provide an inner tube splicing machine in which the tube can be quickly and easily inserted and withdrawn from the machine before and after the operation of the machine and which machine will not start or continue in its operation unless the elements thereof are properly positioned for the safe operation of the machine.

A still further important object of the invention is to provide a rubber tube splicing machine having opposed upper and lower tube holding dies which will not permit the tube to slip, will take a correct and positive position relative to one another when holding the tube and support the tube ends facing the knives for cutting the same, but having the remainder of the tube extending beneath the dies on a side opposite to said knives for protecting the tube and permitting small tube lengths to be spliced.

Still further objects of the invention will be in part pointed out and in part obvious in the following detailed description of the accompanying drawings, in which:

FIG. 2 is a front elevation with the right hand side in section of the portion of the splicing machine shown in FIG. 1.

FIG. 3 is a side elevation partly in section of the present machine as viewed from the right side of FIG. 2.

FIG. 4 is a side elevation of the tube clamping means forming a part of the present machine and viewed from the side opposite to FIG. 3.

FIG. 5 is a cross-sectional view taken on line 5—5 of FIG. 2.

FIG. 6 is an enlarged detail view of the cutting knives anvil, and clamping means forming a part of the machine and as positioned at the start of the cutting of the tube.

Figure 1:
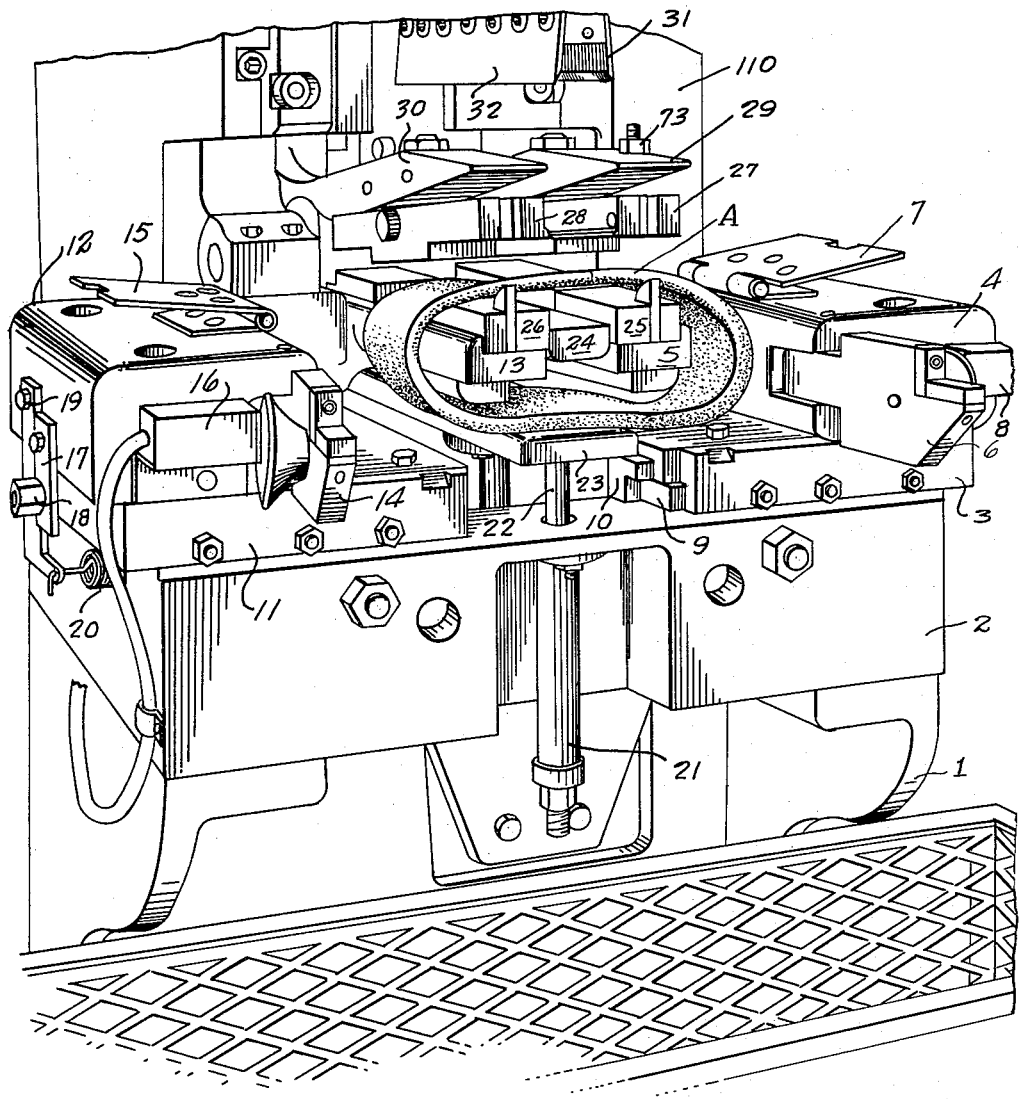
FIG. 1 is a front perspective view of the major portion of the present machine.

FIGS. 7 to 13 inclusive, are enlarged fragmentary views showing the successive steps in the severing and splicing of tube ends by the present machine.

FIG. 14 is an enlarged cross-sectional view of one set of tube clamping dies in their closed position.

FIG. 15 is a top view of the bottom clamping die.

FIG. 16 is a bottom view of the top clamping die.

FIG. 17 is a side view of the top die, and

FIG. 18 is an enlarged cross-sectional view of a guide insert in the bottom die.

Referring now more particularly to the accompanying drawings wherein like and corresponding parts are designated by similar reference characters, numeral 1 indicates the machine base frame for supporting the same upon a surface such as a floor. 2 refers to the table bed frame fixedly mounted upon and extending horizontally of said base frame. A slide 3 is slidably mounted upon the right hand side of said bed frame and has fixedly mounted thereon a table block 4 which has an arm 5. A supporting gate 6 is pivotally mounted to said table block 4 and is capable of extending therefrom to and under arm 5. A hinge plate 7 is pivotally attached to the top of said table block 4 and is capable of extending to said arm 5.

An electric microswitch 8 is mounted upon the front of said table block for being operated by gate 6.

Slide 3 has a gib 9 fixedly connected thereto and said gib slides under the undercut shoulder of a guide 10 fixedly connected to said table bed frame 2.

A second slide 11 is slidably mounted upon the top of said table bed frame 2. A second table block 12 is fixedly mounted upon said second slide and has an arm 13. A second supporting gate 14 is pivotally mounted to the front of block 12 and capable of extending to and under arm 13. A hinge plate 15 is pivotally connected to the top of block 12 and capable of extending to arm 13. A second microswitch 16 is mounted upon the front of block 12 for being operated by gate 14.

An adjustment plate 17 is attached to the left hand side of block 12 as viewed in FIG. 1 and has an adjusted screw 18 extending therethrough. An L-shaped plate 19 is also fixedly connected to said left side of block 12 and has one end of a coil spring 20 connected thereto.

A pneumatic cylinder 21 is mounted within the front of said table bed frame 2 and the piston rod thereof extends through said frame and is fixedly connected to the bottom 23 of a U-shaped anvil having an upper arm 24 spaced above said bottom 23.

A vise jaw 25 is fixedly mounted upon the top of arm 5 while a second jaw 26 is mounted upon the top of arm 13.

A pair of upper jaws 27 and 28 are pivotally mounted above lower jaws 25 and 26 respectively, and extends in line therewith. Pressure feet 29 and 30 are pivotally mounted upon said blocks 4 and 12 as will hereinafter be described and extend in line with and pivotally support upper jaws 27 and 28.

A pair of cutting knives 31 and 32 are positioned above said pressure feet and capable of moving therebetween.

The gib 9 for slide 3 is provided by a plate 33 connected to said slide by bolts 34, as best shown in FIG. 3 of the drawings. A second plate 35 is attached to the bottom rear portion of slide 3 by bolts 36 and extends beneath the undercut shoulder of a second guide 34 fixedly attached to table bed frame 2. Said table bed frame 2 has a longitudinally extending opening 37 in the top thereof, while a rack 38, fixedly connected to the bottom of slide 3, meshes with a pinion 39 extending through said opening. Said pinion 39 is fixedly mounted upon the end of a shaft 40 extending through and rotatably supported by frame 2 and has a second pinion 41 fixedly mounted to the other end thereof. Pinion 41 meshes with a second rack 42 operated by a piston rod 43 extending from within a pneumatic cylinder 44.

Block 4 has an adjustment plate 48 mounted upon the outer right hand side thereof as viewed in FIG. 2 with an adjustment screw 49 in threaded engagement with said rack 38 for permitting a relative adjustment therebetween. For this purpose rack 38 is adjustably connected to slide 3 by bolts 50 and 51 extending through slotted opening 52 in said slide and said block.

An L-shaped plate 45 is also fixedly attached to the right hand side of block 4 and has one end of a coil spring 46 attached thereto while the opposite end of said spring is attached to a rod 47 extending through said table bed frame 2.

Block 4 has a base 53 extending from the rear end portion thereof and laterally towards the center of said machine, while arm 5 extends from said base parallel to and spaced from block 4. Similarly, block 12 has a lateral base 54 at the rear end thereof from which extends arm 13 parallel to both block 12 and arm 5 but spaced therefrom.

Jaw 25, which is fixedly mounted upon arm 5 by any suitable means, such as bolts and the like (not shown), has a bearing insert 55 attached thereto by a bolt (not shown), which has a side wall 56, whose upper portion slants inwardly as at 57. Said jaw has a recess 58 with grooves or ridges 59 extending longitudinally thereof and with wall 56 extending perpendicular thereto. A second bearing insert 60 is also bolted upon jaw 25 in said recess 58 and is similar to insert 55, with both inserts extending laterally of said jaw, providing the side walls of the said recess. Fingers 61 and 63 extend upright from the opposite ends of said jaw and have inwardly slanting sides 62 extending above said jaw.

Upper jaw 27 is of a similar rectangular elongated configuration to jaw 25 but has longitudinally extending end recesses 64 and 65 positioned for receiving fingers 61 and 63. Further, said upper jaw has walls 66 and 67 extending perpendicularly and downwardly from the bottom of said jaw, providing a rectangular bottom projection 68 whose bottom face has ribs or grooves 69a. Said projection 68 is of a configuration and size whereby walls 66 and 67 can fit between inserts 55 and 60 of said lower jaw.

Upper jaw 27 has a recess 69 in the upper face thereof with a pin 70 extending laterally thereof and connected thereto while an eye 71 has said pin extending therethrough. The threaded end 72 of said eye extends through pressure foot 29 and is fastened thereto by nut 73.

Jaws 26 and 28 are similar to said jaws 25 and 27, respectively, while jaw 28 is connected to pressure foot 30 in a similar manner to the connection shown between jaw 27 and pressure foot 29.

A plate 74 as shown in FIG. 3, is attached to base 53 by bolt 75 and has an annular portion 76 through which extends a stub axle 77. The lower curved end 78 of a vertically extending support arm 79 is formed with said portion 76, while the opposite curved end 80 of said arm has a pin 81 to which is pivotally connected a hanger 82 of a pneumatic cylinder 83. The piston rod 84 of said cylinder is also pivotally connected to a pin 85 of a control lever 86 formed with pressure foot 30 while stub axle 77 extends through said lever at its point of jointure to said pressure foot 29 for pivotally supporting the same.

Members similar to said members 74 to 86 are connected to base 54 for pivoting pressure foot 30 in the same manner as for pressure foot 29. For example, plate 87 similar to plate 74 is fixedly mounted on base 54 and pivotally supports lever 88 formed with pressure foot 30. Said lever 88 is operated by a piston rod 89 from a pneumatic cylinder 90 supported from plate 87 in the same manner as cylinder 83.

Hinge plates 7 and 15 are pivotally connected to their respective blocks 4 and 12 by leaves 91 and 92.

The similarity between jaws 27 and 28 is shown in FIG. 6, wherein jaw 28 has a top recess 93 with pin 94 extending laterally thereof and pivotally supporting eye 95 of the bolt 96 extending through pressure foot 30 and attached thereto by nut 97.

The cutter blades 31 and 32 are of a rectangular configuration as shown in FIG. 3 and are attached to a knife block 98 by a series of buttonhead socket cap screws 99. Said knife block has a central bore 100 and a base 101. Said base is attached by a bolt 102 to a hanger 103 having arms 104 and 105 through which extends a stub axle 106. A drive rod 107 connected to a driving means such as a pneumatic cylinder (not shown), is pivotally connected to said axle 106. A U-shaped hood 108 fixedly mounted upon a back 110 of the machine is capable of receiving said knife blade drive therein when in its uppermost position. Said knife block extends laterally from a guide 109 slidably mounted upon said back 110.

The anvil formed by bottom 23 and top 24 has the top and bottom joined at corresponding ends to a block 111 which is positioned at the rear of the machine as best shown in FIG. 2.

Block 12 is moved to and from block 4 by a mechanism, not shown, which is similar to elements 38 to 41 for moving block 4. A pinion 114 meshing with rack 42 functions in the same manner as pinion 41, but for block 12.

Knife block 98 has an electrical heating element 112 extending within central bore 100 for being connected to an electrical circuit. A thermocouple is positioned within a second bore 115 of said knife block and connected to said electric circuit for controlling the operation of heating element 112 and thus the temperature of the blades 31 and 32. As shown in FIG. 6, knife block 98 has slanting sides so that said blades diverge from one another in a downward direction. As an example of one use of the present machine, there has been shown in the drawings in cross-section an unvulcanized rubber tube A having ends B and C. Such tube may vary in length, but in actual practice, connected inner tube lengths of 6½ inches have been used, but the length only depends upon the size and spacing of arms 5 and 13.

Such tubes are first applied with a powder, for example, of soapstone between the inner surfaces of the tubing and then positioned with the opposite marginal end portions upon the jaws 25 and 26. In order to insert the tubing, gates 6 and 14 are opened to the position shown in FIG. 1, whereupon they will operate the microswitches 8 and 16, respectively, to disconnect the current to the mechanism (not shown), for operating the machine, but after the tubing is mounted, said gates are pivoted with the end of gate 6 positioned under arm 5 and gate 14 under arm 13, as shown in FIG. 5, whereupon, the microswitches will be closed to close the circuit.

Hinge plates 7 and 15 are then pivoted to the position of FIGS. 2 and 6, whereupon, they are left upon the inner tube A. Cylinders such as 83 and 90 are then supplied with a fluid for moving piston rods 84 and 89 upwardly, whereupon, these levers will pivot pressure feet 29 and 30 downwardly, pressing jaws 27 and 28 against the top of the tubing, as shown in FIGS. 6 and 14. The upper jaw will force the tubing ends into the recess 58 of the bottom jaw and the ribs 59 and 69a will grip the tubing.

Cylinder 21 has at such time been supplied with a fluid for moving anvil 24 upwardly between said lower jaws, as shown in FIG. 6, with bottom 23 supporting the remainder of said tubing.

Rack 42 is operated by supplying fluid to cylinder 44 for moving blocks 4 and 12 to the correct position for properly spacing arms 5 and 13 to the position of FIG. 6.

Current is supplied to heating element 112 for heating blades 31 and 32, and thereafter, control rod 107 is moved downwardly by its driving means in the manner shown in FIGS. 7 to 10 of the drawings. That is, said blades are caused to engage tubing A adjacent the ends B and C and to gradually cut into and through said tubing. At the same time, cylinder 44 is operated to progressively move blocks 4 and 12 slightly apart so that the jaws 25, 26, 27 and 28 will move the tube ends apart, giving a step cut thereto with the result that the remaining ends D and E of said tubing have a slant and are moved away from said blades as in FIG. 10 to prevent a searing of said tubing.

Upon said blades completing the cutting operation, control rod 107 is raised, withdrawing said blades to their upper position as shown in FIG. 11, and also cylinder 21 has fluid applied to the opposite end thereof for withdrawing anvil top 24 from between arms 5 and 13.

Thereafter, rack 42 is operated by cylinder 44 for moving blocks 4 and 12 rapidly towards one another, forcing tube ends D and E against one another as shown in FIGS. 12 and 13, where, due to the tacky condition of said tubing, they become united, producing a small rib F. Cylinders 83 and 90 are then applied with fluid for moving rods 84 and 89 downwardly raising pressure feet 29 and 30 and jaws 27 and 28. Hinge plates 7 and 15 and gates 6 and 14 are then pivoted to the position of FIG. 1, whereupon, the tubing can be withdrawn and thereafter subjected to vulcanizing for being permanently joined to the rib F.

It is to be appreciated that cylinders 21, 44, 83 and 90 are of the double-acting type, that is, fluid can be admitted to either end thereof on opposite sides of the piston therein for moving the same within the desired direction. Also, many conventional means can be employed for giving these cylinders the proper step-by-step operation for automatically performing the proper sequence of steps in the cycle of operation of the machine.

Gates 6 and 14 are of a width for supporting the free ends of arms 5 and 13 upon the slides 3 and 11, as during the operation of the supplying cycle there is a thrust tending to push said arms both outwardly and downwardly, and said gates support said arms for resisting these thrusts.

Fingers 61 and 63 of lower jaw 25 mate with recesses 64 and 65, respectively, of the upper jaw 27 for giving a positive position to the top jaw when said jaws are brought together.

The blocks 4 and 12 and the connected elements are similar but oppositely positioned. Thus block 12 has all of the same elements connected thereto as shown for block 4 in FIGS. 2 and 3.

The present machine is capable of considerable modification by such changes thereto as come within the scope of the appended claims is deemed to be a part of the invention.

We claim:

1. A machine for preparing and splicing ends of unvulcanized rubber stock comprising a supporting frame, a pair of blocks slidably mounted on said frame for movement to and from one another, means for moving said blocks to and from one another, a base for each of said blocks extending laterally from one end portion thereof towards the other block, an arm for each of said blocks connected at one end portion to its respective base and extending laterally of said base between said blocks, but spaced therefrom and said frame providing a space for the stock beneath said arm, means mounted on each of said arms for supporting end portions of said stock material above said arms, a pair of gates each being pivotally connected to a different one of said blocks and capable of pivoting to and beneath one of said arms for supporting the same during operation of the machine and away therefrom for the removal and placing of stock relative to said arms, means pivotally connected to said bases for retaining said stock material end portions on said supporting means, means for cutting stock ends held by said retaining means, an anvil for supporting said stock end portions, and means connected to said frame for moving said anvil between and from said arms.

2. A machine for preparing and splicing ends of unvulcanized rubber stock comprising a supporting frame, a pair of blocks slidably mounted on said frame for movement to and from one another, means for moving said blocks to and from one another, a base for each of said blocks extending laterally from one end portion thereof towards the other block, an arm for each of said blocks connected at one end portion to its respective base and extending laterally of said base between said blocks, but spaced therefrom and said frame providing a space for the stock beneath said arm, means mounted on each of said arms for supporting end portions of said material above said arms, a pair of jaws, a pair of pressure feet each being pivotally connected to a different one of said blocks, means pivotally connecting a medial portion of each one of said jaws to and beneath a different one of said pressure feet above said supporting means, means for pivoting said pressure feet for moving their connected jaw to and from the supporting means therebeneath for retaining stock ends therebetween, means for cutting stock ends held by said supporting means, an anvil for supporting said stock end portions, and means connected to said frame for moving said anvil between and from said arms.

3. A machine for preparing and splicing ends of unvulcanized rubber stock comprising a supporting frame, a pair of blocks slidably mounted on said frame for movement to and from one another, means for moving said blocks to and from one another, a base for each of said blocks extending laterally from one end portion thereof towards the other block, an arm for each of said blocks connected at one end portion to its respective base and extending laterally of said base between said blocks, but spaced therefrom and said frame providing a space for the stock beneath said arm, a pair of jaws each having a recessed ribbed upper face and being mounted on a different one of said arms, a second pair of jaws each having a ribbed projection on the lower face thereof capable of mating with the recess in one of said first mentioned jaws and having a recessed upper face, a pair of pressure feet each pivotally connected at one end to a different one of said blocks, a pair of pins each extending across the recess in the upper face of a different one of said second mentioned jaws and connected thereto, means pivotally connecting each of said pressure feet to a different one of said pins for pivotally carrying said jaws with said pressure feet, means for cutting stock ends held by said jaws, an anvil for supporting said stock end portions and means connected to said frame for moving said anvil between and from said arms.

References Cited in the file of this patent

UNITED STATES PATENTS

| | | |
|---|---|---|
| 2,254,596 | Breth | Sept. 2, 1941 |
| 2,272,881 | Stevens | Feb. 10, 1942 |
| 2,273,463 | Campbell | Feb. 17, 1942 |
| 2,541,696 | George | Feb. 13, 1951 |
| 2,576,940 | Iknayan | Dec. 4, 1951 |
| 2,600,216 | Clayton | Nov. 24, 1953 |